(No Model.)
J. P. FABER.
SULKY.
No. 522,657. Patented July 10, 1894.
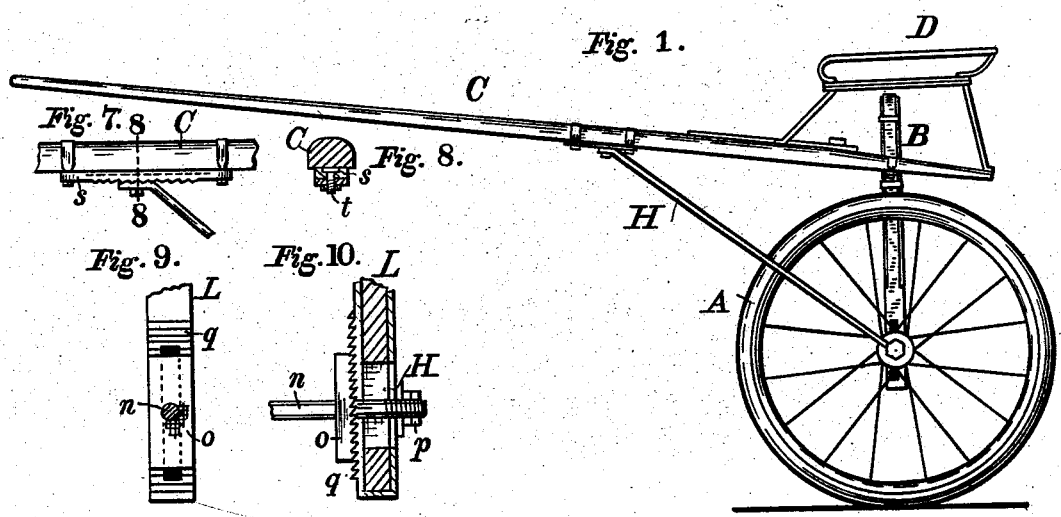
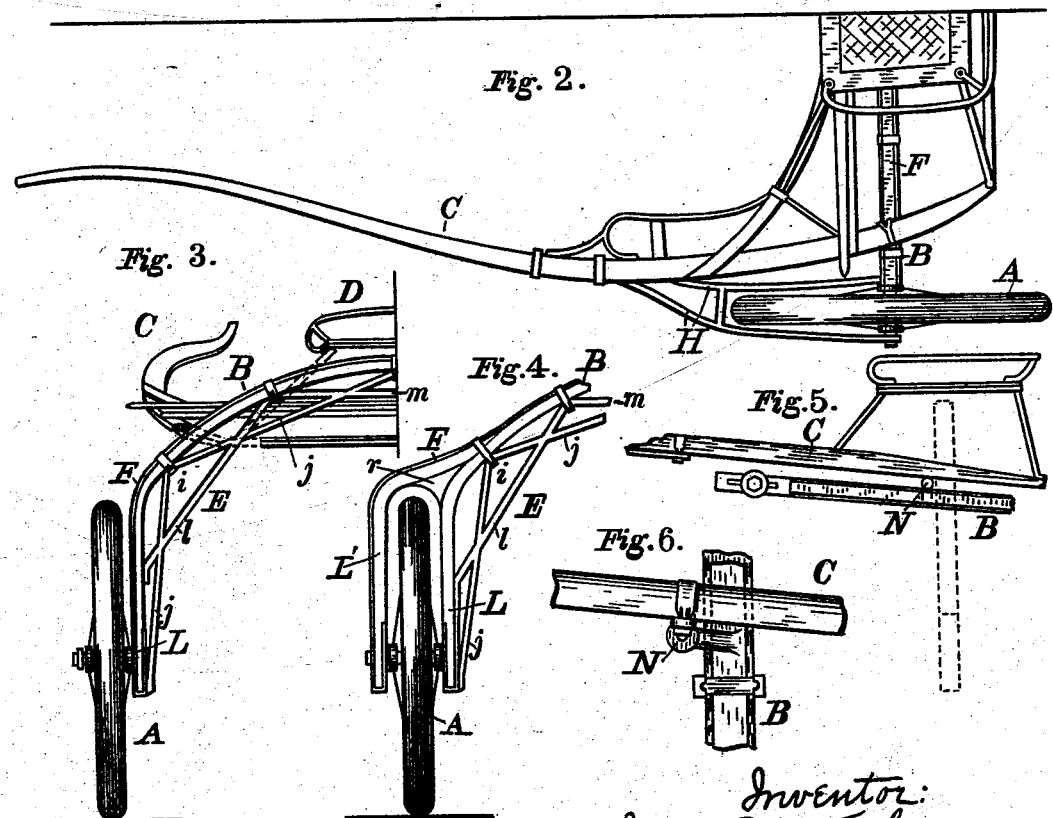
Witnesses:
C. R. Osgood.
C. G. Crannell
Inventor:
John Peter Faber.
By Geo. B. Selden,
Atty

UNITED STATES PATENT OFFICE.

JOHN PETER FABER, OF ROCHESTER, NEW YORK, ASSIGNOR TO ALICE FABER, OF SAME PLACE.

SULKY.

SPECIFICATION forming part of Letters Patent No. 522,657, dated July 10, 1894.

Application filed September 21, 1892. Serial No. 446,400. (No model.)

*To all whom it may concern:*

Be it known that I, JOHN PETER FABER, a citizen of the United States, residing at Rochester, in the county of Monroe, in the State of New York, have invented certain Improvements in Sulkies, of which the following is a specification, reference being had to the accompanying drawings.

My invention relates to improvements in the construction of trusses for sulkies, which improvements are fully described and illustrated in the following specification and the accompanying drawings,—the novel features thereof being specified in the claims annexed to the said specification.

In the accompanying drawings representing a sulky embodying my improvements—Figure 1 is a side elevation. Fig. 2 is a half-plan-view. Fig. 3 is a half-rear-elevation. Fig. 4 represents the trussed axle provided with a yoke for the wheels. Fig. 5 is a partial side-view, representing the axle folded up for shipment. Fig. 6 represents the joint between the axle and the thills. Fig. 7 is a side-view of a portion of one of the thills, showing the manner of attaching the brace thereto. Fig. 8 is a section on the line 8—8, Fig. 7. Fig. 9 is a side view of the lower part of the axle. Fig. 10 is a section of the same.

A represents the wheels of my improved sulky, B the trussed axle, C the thills, and D the seat.

The construction of the trussed axle will be best understood from Fig. 3, from which it will be seen that the central part of the axle is bent outward and downward to receive the spindles of the wheels, and that the axle is trussed on the inside by the bracing E, and, if desired, when made of wood, stiffened on the outside by the metallic strip F. The braces H are also used, between the thills and the lower ends of the axle, to stiffen the structure. The axle is bent to give a suitable arched form, adapted to suit the use of bicycle wheels with pneumatic tires. The brace E consists principally of a rod *j* which starts from the under side of the axle, at the center, and runs diagonally downward and outward to a point *i*, at which it is clamped to the axle, and thence downward to a point of attachment near the lower end of the axle. The rod *j* is strengthened by the rod *l*, which extends diagonally across the former, crossing it at two points and being secured at its ends to the axle at points between the points where the rod *j*, is attached. Another rod, *m*, extends from the upper end of the rod *l* on one side horizontally across to the corresponding rod on the opposite side, crossing the rods *j*. The rods need not be connected together where they meet, or the joints where the rods cross each other may be either welded or forged, or the rods may be clamped or otherwise attached together. By this method of bracing I am enabled to secure the maximum of lightness and strength.

The shape of the axle, and character of the bracing with the diagonally arranged rods, enables me to secure the requisite strength and rigidity, while at the same time the space between the lower portions of the truss, notwithstanding the low wheels, is maintained so great as to avoid any chance of interfering with the free movements of the horse's feet. This avoidance of interference with the feet or limbs of the horse in a sulky which otherwise might be too narrow is secured by extending the curved part of the arch or axle to a point near the summit of the wheel and then continuing it downwardly in a vertical or approximately vertical line beside and near to the wheel as illustrated. Obviously this form of the axle tends to effect the desired object without the particular bracing and also in the absence of any bracing.

The seat and thills are of any ordinary or preferred structure. In order to provide for adjusting the distance of the seat from the ground, and to maintain the balance for horses of different sizes, I make the spindles of the wheels adjustable in the lower portions of the trussed axle, as indicated in Figs. 9 and 10. In these figures, *n* represents the spindle, which passes through a slot in the upright portion L of the axle, being provided on one side with the flange *o*, and on the other with a jam nut *p*. A serrated plate *q* is attached to the axle, and the inner face of the plate *o* is provided with corresponding serrations, so that the axle is held firmly in any position to which it may be adjusted. By this means I am enabled to raise or lower the thills, so as to bring them to the proper position on the horses of different heights, and so to maintain the proper balance of the sulky and to keep the axle vertical.

In Fig. 4 I have represented the axle as provided on the outside of the wheel with the arm L', which is attached to the axle above the wheel at its upper end and bent outward so as to sustain the outer end of the spindle on which the wheel turns. The arm L' may be made in one piece with the main portion of the axle or it may be attached thereto in any suitable manner. The strap F may be continued the whole distance along the arm L', the lower end of which may be provided with devices for adjusting the spindle up and down as already described. A suitably shaped bracket or corner-piece $r$ may be introduced between the arms L L' at the point where they join. The truss-bracing E will be used with the arm L', the same as though the arm were omitted. It will be understood that the bracing is secured to the axle by suitable clips or bolts.

The wheels are preferably provided with ball-bearings, of any ordinary or preferred type. The lower end of the axle or the wheel-spindle is braced from the thills by the brace H, which may be single or double, and attached to the lower end of the axle, or to the inner end of the spindle inside the nut $p$, or to the outer end of the spindle.

In order to provide for shipping my improved sulky, I connect the axle with the thills by a hinge-joint N, so that, the wheels being taken off, the axle may be folded up, as indicated in Fig. 5. The brace H will in this case be attached to the thills so that they can be readily removed, or adjusted lengthwise, while this is necessary also in order to provide for raising or lowering the wheels. In order to accomplish this latter result, I secure to the under side of the thill by suitable clips or bolts, a slotted serrated plate $s$, Figs. 7 and 8, through which the bolt $t$ passes, by which the brace is attached to the thill. The eye at the end of the brace is serrated, or a serrated washer is interposed. By this device the point of attachment of the brace to the thill is readily adjusted, and the brace may be readily removed, when desired.

The axle B may be made of suitable tubing, and tubes may be used for the rods of the bracing.

In the use of the term sulky in these specifications and claims I do not wish to be understood as excluding any vehicle for which the new improvements are in their nature adapted.

I am aware that in a prior sulky the seat was supported by rods suspended from the top of uprights rising above said seat and sustained upon short spindles, said uprights being stayed by braces or bars and by a frame adapted to surround the horse, and said seat being raised above the horse's back and such construction is not of my invention.

I claim—

1. The combination, in a sulky, of the arched axle B, having diagonally arranged interior bracing E, and the adjustable wheel-spindle $n$, substantially as described.

2. The combination, in a sulky, of the arched axle B, having diagonally arranged interior bracing E, the adjustable wheel-spindle $n$ and adjustable brace H, substantially as described.

3. The combination, in a sulky, of the arched axle B, having diagonally arranged interior bracing E, the thills C, and joints N whereby the axle may be folded up against the thills, substantially as described.

4. The combination, in a sulky, of the arched axle B, having diagonally arranged interior bracing E, the thills C, joints N, and the removable braces H, substantially as described.

5. The combination, in a sulky, of the arched axle B, having diagonally arranged interior bracing E, the outer arm L', and the wheel-spindle $n$, substantially as described.

6. The combination in a sulky of the arched axle B and the adjustable wheel spindle $n$ and a vertically adjustable brace H, connecting said spindle directly to the shaft substantially as set forth.

7. The combination in a sulky of the arched axle B, thills C, and joints N whereby the axle may be folded up against the thills, substantially as set forth.

8. The combination in a sulky of the arched axle B, thills C, and joints N whereby the axle may be folded up against the thills and the removable braces H, substantially as set forth.

JOHN PETER FABER.

Witnesses:
GEO. B. SELDEN,
G. S. DEY.